(12) United States Patent
Bogasky et al.

(10) Patent No.: US 7,565,540 B2
(45) Date of Patent: *Jul. 21, 2009

| (54) | FULLY ELECTRONIC IDENTITY AUTHENTICATION |
|---|---|
| (75) | Inventors: John J. Bogasky, Silver Spring, MD (US); Carl Almond, Tampa, FL (US); Andrew Schaefer, Hoboken, NJ (US) |
| (73) | Assignee: Accenture Global Services GmbH, Schaffhausen (CH) |
| ( * ) | Notice: Subject to any disclaimer, the term of this patent is extended or adjusted under 35 U.S.C. 154(b) by 652 days. |
| | This patent is subject to a terminal disclaimer. |
| (21) | Appl. No.: 11/176,681 |
| (22) | Filed: Jul. 8, 2005 |
| (65) | Prior Publication Data |
| | US 2006/0031116 A1  Feb. 9, 2006 |
| | Related U.S. Application Data |
| (63) | Continuation-in-part of application No. 10/743,321, filed on Dec. 23, 2003, now abandoned. |
| (60) | Provisional application No. 60/444,885, filed on Feb. 5, 2003. |
| (51) | Int. Cl. *H04L 9/00* (2006.01) |
| (52) | U.S. Cl. ................................ 713/173; 705/12 |
| (58) | Field of Classification Search .............. None See application file for complete search history. |
| (56) | References Cited |

U.S. PATENT DOCUMENTS 6,250,548 B1   6/2001  McClure et al.
6,829,356 B1  12/2004  Ford
6,842,449 B2   1/2005  Hardjono
6,931,133 B2   8/2005  Andrews et al.
6,973,581 B2  12/2005  Chung et al.
7,055,742 B2   6/2006  Sinha
7,237,717 B1   7/2007  Rao et al.
7,260,552 B2 *  8/2007  Jorba et al. .................... 705/12
7,306,148 B1  12/2007  Morganstein
2002/0133396 A1   9/2002  Barnhart
2002/0138341 A1 *  9/2002  Rodriguez et al. ............. 705/12
2005/0021479 A1   1/2005  Jorba et al.
2006/0095376 A1   5/2006  Mitchell et al.

FOREIGN PATENT DOCUMENTS

| EP | 1 001 386 A1 | 5/2000 |
|---|---|---|
| WO | WO 00/21041 | 4/2000 |
| WO | WO 01/31589 | 5/2001 |
| WO | WO 01/39049 | 5/2001 |
| WO | WO 02/43326 | 5/2002 |
| WO | WO 2004/070665 | 8/2004 |

OTHER PUBLICATIONS

International Search Report and Written Opinion dated Jun. 29, 2005, for International Application No. PCT/EP/2004/001022 (10 pages).

\* cited by examiner

*Primary Examiner*—Pramila Parthasarathy
(74) *Attorney, Agent, or Firm*—Finnegan, Henderson, Farabow, Garrett & Dunner, LLP

(57) ABSTRACT

The present invention relates to a system and method for fully electronic identity authentication, with particular application to electronic election registration and voting. In particular, the present invention provides an authentication system that operates in conjunction with a secure server to authenticate users to provide access information as needed for the authenticated users to access the secure server.

24 Claims, 17 Drawing Sheets

Election Auditing
Methodology 1100

Establish Agent Identification
Method 1200

FULLY ELECTRONIC IDENTITY AUTHENTICATION

CROSS REFERENCE TO RELATED APPLICATIONS

This application is a continuation in part to U.S. patent application Ser. No. 10/743,321 filed on Dec. 23, 2003 now abandoned, which claims benefit of U.S. Provisional Application No. 60/444,885 filed Feb. 5, 2003, and the subject matters of both these applications are hereby incorporated by reference in full.

STATEMENT REGARDING FEDERALLY SPONSORED RESEARCH OR DEVELOPMENT

This invention was made with Government support under the Orders for Service DOD-FVAP-2002-C-2147M and DOD-FVAP-2004-C-2285M governed by the NIH-CIOSP Contract# 263-01-D-0071 awarded to Accenture by the National Institute of Health Division of Information Technology Acquisitions. The Government has certain rights in the invention.

BACKGROUND OF THE INVENTION

1. Field of the Invention

The present invention relates to a system and method for fully electronic identity authentication, with particular application to electronic election registration and voting.

2. Discussion of the Related Art

The elections process has come under increasing scrutiny over the years. In particular, voting machine failures, confusing or incorrect ballots, confusion over voting locations, and mishandled absentee ballots have been held out as focal points in recent elections.

Typically, a person intending to vote must register prior to an election. On an election day a person must then locate their assigned polling location, as well as navigate what can be can be a complex ballot or balloting machine.

Even more problematic is the case of an absentee voter, one who will be out of the voting jurisdiction or unable to travel to the polling location on an election day. For example, registration for absentee balloting must take place well before the election. An absentee ballot is then provided to the absentee voter, generally by mail. The absentee voter must then complete the ballot and return it to the absentee voter's local election office by a specific date, again, generally by mail. Aside from the obvious issues associated with using the mail for timely delivery of the ballot, there exist many additional opportunities for an absentee ballot to be mishandled.

For a voter who is absent from their jurisdiction or a voter living in a foreign country the issues associated with using the mail may be amplified considerably. The need to mail a ballot early enough to arrive at a local election office on or before the scheduled deadline may limit an absentee voter's ability to review information concerning the issues and candidates associated with an election. For example, due to the mailing requirements of an absentee ballot, an absentee voter may not have an opportunity to view or read about candidate debates that may occur after the absentee voter has cast and mailed their ballot but before the day of the actual election.

These and other deficiencies exist in current voting solutions. Therefore, a solution to these problems is needed, providing an improved voting solution, including the ability for an absentee voter to register to vote, receive their ballot and to securely cast his or her ballot so that it is counted in an election.

SUMMARY OF THE INVENTION

Accordingly, in view of these and other deficiencies inherent in current voting solutions, the present invention is directed to a secure electronic registration and voting solution incorporating integrated end-to-end voting system architecture and processes providing secure identification and authentication, voter registration, ballot definition, ballot presentation to the voter, voting, and ballot tabulation via secure transmission over the network. Particularly, the present invention relates to a system and method for fully electronic identity authentication, with particular application to electronic election registration and voting.

In one embodiment of the present invention, a secure electronic registration and voting system, for use by a user, such as a potential voter, a voter, or a local election official, providing access to voting related subsystems and processes through a network is disclosed. The secure electronic registration and voting system includes a central hosting facility connected to the network. The central hosting facility includes a home page as an access point for the user, an application processing segment for providing election processing, and a storage segment for temporary and persistent storage of data. The secure electronic registration and voting system also includes a computing device connected to the network for accessing the central hosting facility.

According to another embodiment of the present invention, a secure electronic registration and voting system for use by users and local election officials providing access to voting related subsystems and processes through a network is disclosed. The secure electronic registration and voting system includes a central hosting facility, including a system web server for housing a home page and web pages, a data storage device for storing local election office data, and an application processing segment providing the voting related subsystems and processes. The application processing segment includes an identification and authentication subsystem and associated services for identity proofing and assigning a roaming digital certificate to users and local election officials by the user or local election official submitting an approved credential or retrieving, completing, and submitting an identity proofing form, a voter registration subsystem and associated processes for registering a user to vote by completing an electronic application, digitally signing the application with the assigned roaming digital certificate, and having the application submitted electronically, wherein a local election official may review the application, approve or deny the application, update the status of the application, and communicate the status of the application to the user, a ballot creation subsystem and associated processes for creating a ballot definition file by an official of the local election office, transforming the ballot definition file to a standard format, validating the ballot by the local election official, and providing the ballot for use by the user, a voting subsystem and associated processes for providing secure voting by identifying and authenticating a user that logs in to vote and request a ballot, retrieving the user's identification information and digital certificate, generating a ballot from the user's local election office ballot definition file, digitally signing the ballot, sending the ballot to the user, receiving from the user the completed ballot digitally signed with the user's roaming digital certificate, time stamping the ballot, encrypting the ballot with a user's symmetric key, and storing the encrypted ballot, transmitting a ballot summary to the user for confirmation, receiving confirmation, time stamping the ballot and encrypting the user's symmetric key with a local election office's public key, and storing the encrypted symmetric key and associated encrypted ballot in the local election office's electronic ballot box, a ballot tabulation and reconciliation subsystem and associated processes for reconciling encrypted ballots, wherein ballot tabulation includes providing a local election office with a token and a tabulation computer and requiring one election official to login to the tabulation computer and a second election official to login to the central hosting facility, separating voter identification information from the encrypted ballots and transferring the encrypted ballots to the tabulation computer, decrypting the ballots by decrypting the symmetric key associated with each ballot with the local election office's public key and decrypting each ballot with its associated symmetric key, and tabulating the decrypted ballots, and a common services subsystem and associated processes. The secure electronic registration and voting systems also includes a computer for accessing the central hosting facility through the network.

According to a further embodiment of the present invention, a method for identifying and authenticating a user through a secure electronic registration and voting system is disclosed. The method includes the steps of accessing the home page of the secure electronic registration and voting system, determining the existence of the user's department of defense credential, issuing a digital signature if the department of defense credential exists, providing an electronic federal postcard application to the user, and retrieving the completed electronic federal postcard application.

According to another embodiment of the present invention, a method for identifying and authenticating a user through a secure electronic registration and voting system is disclosed. The method includes the steps of accessing the home page of the secure electronic registration and voting system, determining the existence of the user's department of defense credential, determining the existence of the user's digital signature if the department of defense credential does not exist, providing an electronic federal postcard application to the user if the digital signature exists, and retrieving the completed electronic federal postcard application.

According to further embodiment of the present invention, a method for identifying and authenticating a user through a secure electronic registration and voting system. The method includes the steps of accessing the home page of the secure electronic registration and voting system, determining the existence of the user's department of defense credential, determining the existence of the user's digital signature if no department of defense credential does not exist, and providing an identity proofing form to the user if the user's digital signature does not exist.

According to another embodiment of the present invention, a method for registering a user to vote with the user's local election office through a secure electronic registration and voting system is disclosed. The method includes the steps of logging into the secure electronic registration and voting system by the user, authenticating the user as a valid user, completing an electronic application by the user, signing the completed electronic application with a digital signature assigned to the user, submitting the digitally signed electronic application, storing the electronic application in a database on the secure electronic registration and voting system assigned to the user's local election office, and notifying the user's local election office of the receipt of the user's completed electronic application.

According to a further embodiment of the present invention, a method for creating a ballot for use on a secure electronic registration and voting system is disclosed. The method comprises the steps of creating a ballot definition file, storing the ballot definition file on the secure electronic registration and voting system, transforming the ballot definition file, storing the ballot definition file in a ballot definition database, validating the content of the ballot by the local election office, and submitting the ballot definition file to a voting engine.

According to a further embodiment, a method for voting using a secure electronic registration and voting system is disclosed. The method includes the steps of requesting a ballot by a user of the secure electronic registration and voting system, voting electronically by the user, securing the ballot by the secure electronic registration and voting system, reconciling the ballot, and tabulating the ballot by the user's local election office.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to various embodiments of the present invention, examples of which are illustrated in the accompanying drawings.

Figure 1:
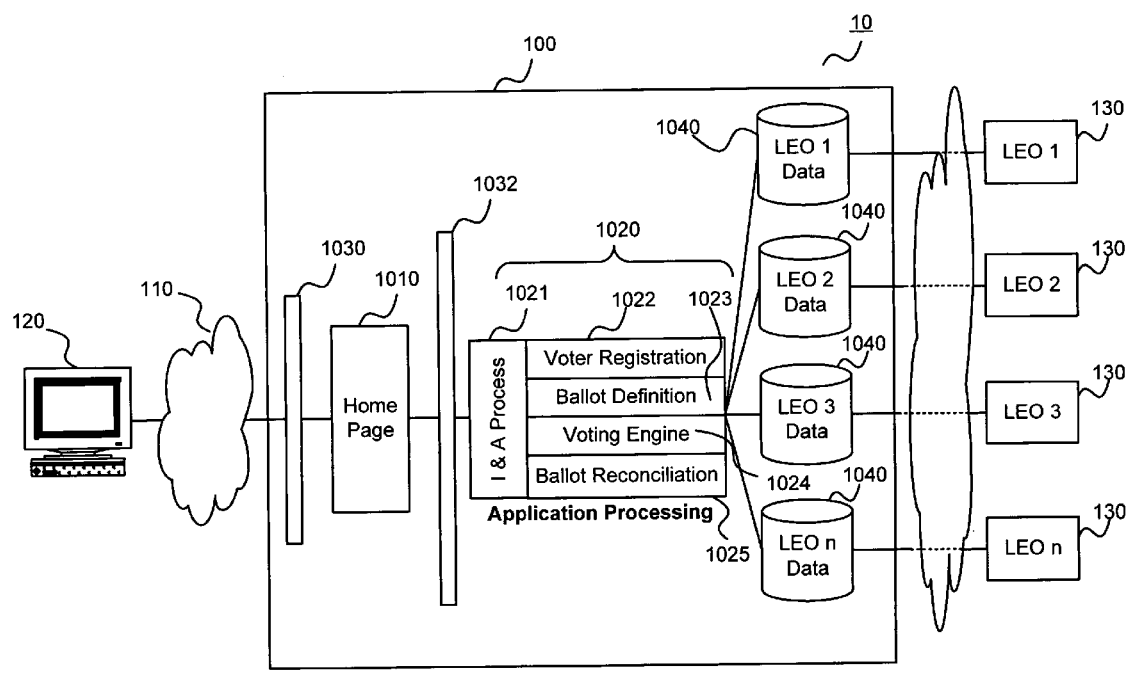
FIG. 1 depicts the electronic registration and voting solution system architecture according to an embodiment of the present invention.

FIG. 1 shows the electronic registration and voting solution system architecture 10 according to an embodiment of the present invention. The system architecture includes a central secure hosting environment 100 accessible through a network 110, such as the Internet, by a user, such as an absentee voter or a person desiring to register as a voter, from any computing device 120 anywhere in the world and subject to the voter's local or State laws governing the absentee voting process. The central hosting facility 100 is also accessible by officials of a local election office via a computer, or computers 120, over the network 110. The computer 120 of a local election office also includes additional processes 130 for managing the voting process for that jurisdiction. FIG. 1 illustrates the local election office processes 130 logically associated with storage devices 1040 assigned to the local election offices.

According to an embodiment of the present invention, a user accesses the central hosting facility 100 over the Internet with a computer 120. Through a registration process and assignment of a roaming digital certificate the user's access is not tied to a specific computer; therefore, the user is not required to use the same computer each time he or she accesses the central hosting facility 100. For example, a user may access the central hosting facility 100 to register to vote from a computer in one location, such as a home computer, and may vote later from a different computer in a different location, such as a computer in an Internet cafe in any city, state, or country.

The central hosting facility 100 includes a system web server housing a home page 1010, an application processing segment 1020, firewalls 1030 and 1032, and data storage devices 1040. According to one embodiment, centralized servers are configured to create the central hosting facility 100. Centralized servers provide greater security and reliability, and the ability to scale the hardware configuration. Centralized servers also provide lower application maintenance and support costs, as well as reduced costs to "harden the site" to detect and prevent against unwanted intruders or attacks.

The system home page 1010 is accessible by a user's computer 120 through a firewall 1030. The system home page 1010 is used as an access point to other system services and information concerning the access and use of the central hosting facility 100. The system home page 1010 provides access to the application processing segment 1020 through a second firewall 1032.

The application processing segment 1020 of the central hosting facility 100 provides the necessary processing hardware and software for the various subsystems and processes associated with voter registration and voting. Applications associated with the application processing segment 1020 may include identification and authentication 1021, voter registration 1022, ballot definition 1023, voting engine 1024, and/or ballot reconciliation 1025. Local election office processes 130 are also located on local election office computers 120. The local election office processes 130 work in conjunction with the application processing segment 1020 as part of the process architecture of the present invention.

The data storage devices 1040 of the central hosting facility 100 provide data storage for each local election office using the central hosting facility 100. A local election office's storage device 1040 provides "voting system records" for that local election office only, and supports local ownership of processing and data. Furthermore, uploading data to, or downloading of data from, the local election office's storage is possible only by designated officials of the local election office through identification and authentication, and authorization access procedures. The local election office's storage may include voter registration information, ballot definitions and styles, and encrypted voted ballots, as well as comprehensive audit records of all events. It can be appreciated by one skilled in the art that the data storage devices 1040 may be physically or logically separated. The storage devices 1040 may also be located within a single server or divided among many servers.

According to an embodiment of the present invention, the local election office computer gains access to the central hosting facility 110 in a manner similar to that of a voter; namely, through a network 110, such as the Internet, using the roaming digital certificate technology. Through the application processing segment 1020 and the application processes of the local election office 130 a local election office computer includes uploading and downloading capabilities for that local election office's data. Using the application processes 130 of the local election office computer to access the central hosting facility the local election official can access services, such as voter registration, ballot definition, ballot reconciliation, separating encrypted ballots from the voter records to maintain anonymity, and downloading of encrypted ballots. The local election official can also decrypt downloaded ballots and submit them to ballot tabulation and ballot auditing.

Figure 2A:
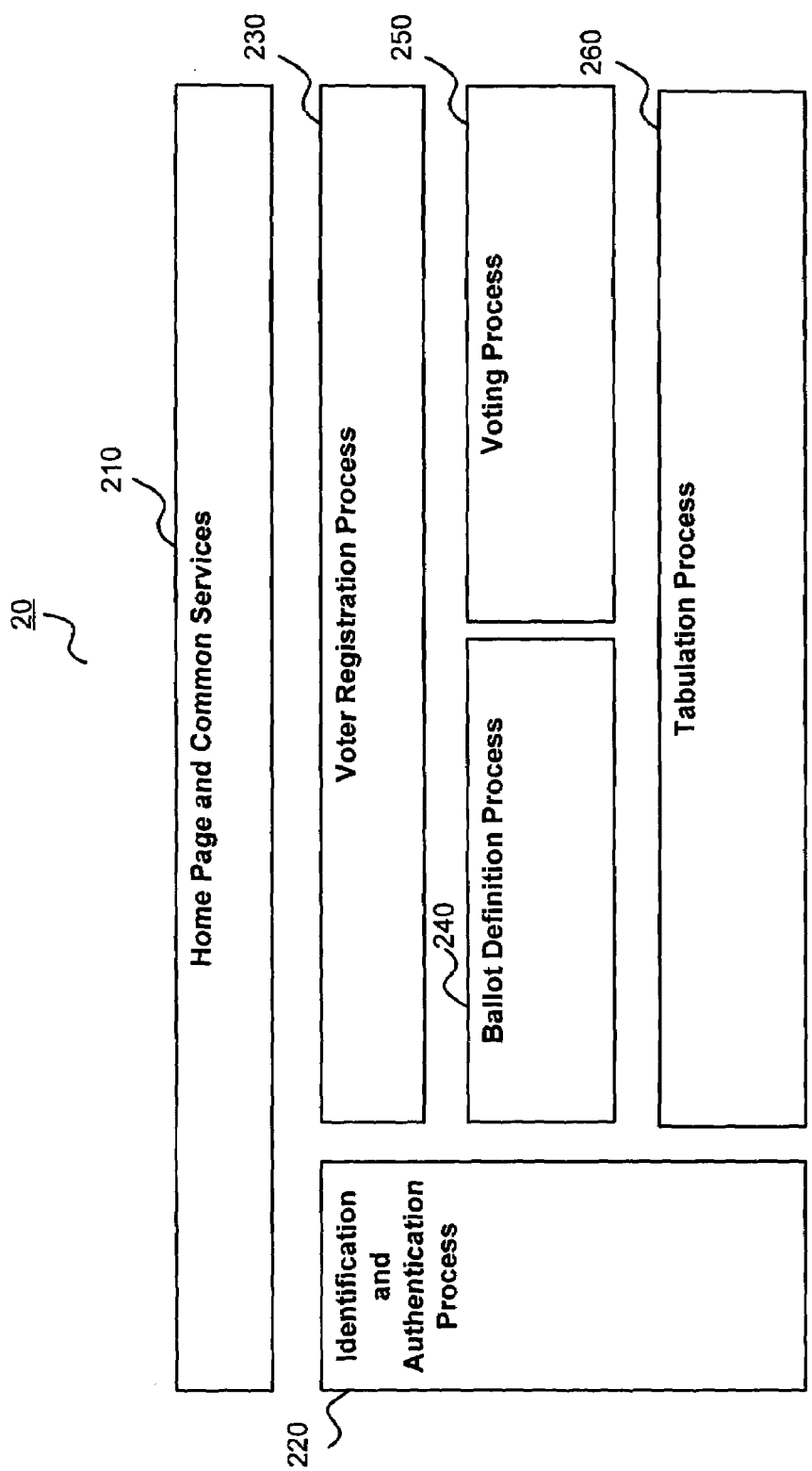
FIG. 2a depicts an overview of the process architecture incorporated in the electronic registration and voting solution, according to an embodiment of the present invention.

FIG. 2a shows an overview of the process architecture 20 incorporated in the electronic registration and voting solution, according to an embodiment of the present invention. Generally, the process architecture is separated into home page and common services 210, identification and authentication processes 220, voter registration processes 230, ballot definition processes 240, voting processes 250, and tabulation processes 260.

Figure 2B:
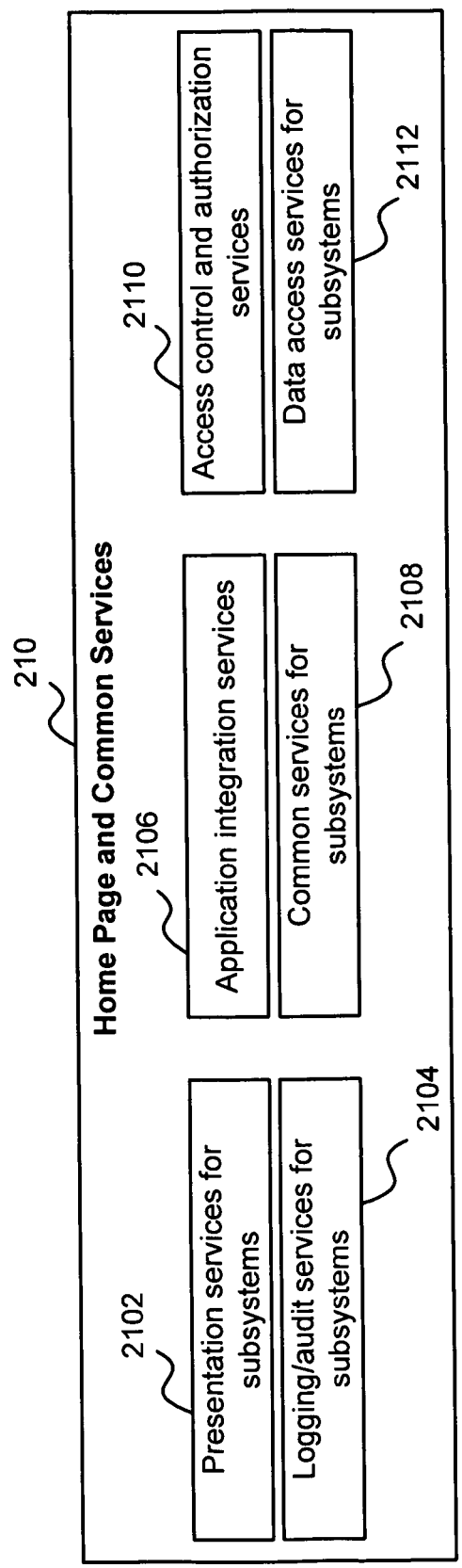
FIG. 2b depicts a detailed view of the home page and common services, according to an embodiment of the present invention.

FIG. 2b shows a detailed view of the home page and common services, according to an embodiment of the present invention. The home page 1010, as shown in FIG. 1, provides the initial access point to the application processes of the central hosting facility. As shown in FIG. 2b, home page and common services provide the initial access and presentation services. According to one embodiment of the present invention, these home page and common services include presentation services for subsystems 2102, logging and auditing services for subsystems 2104, application integration services 2106, common services for subsystems 2108, access control and authorization services 2110, and data access services for subsystems 2112.

Presentation services 2102 provide the mechanism for presenting information to the user in a consistent fashion. Logging and auditing services 2104 allow for logging and auditing of activities that take place within the processes and systems of the central hosting facility. Application integration services 2106 provide the ability for the various processes and systems of the central hosting facility to interact in a consistent fashion. Common services for subsystems 2108 reduce overhead by reducing redundant services used by many of the subsystems. Access control and authorization services 2110 assist in controlling access to services by only those authorized to use them. Data access services for subsystems 2112 controls the access to data by the various subsystems.

Figure 2C:
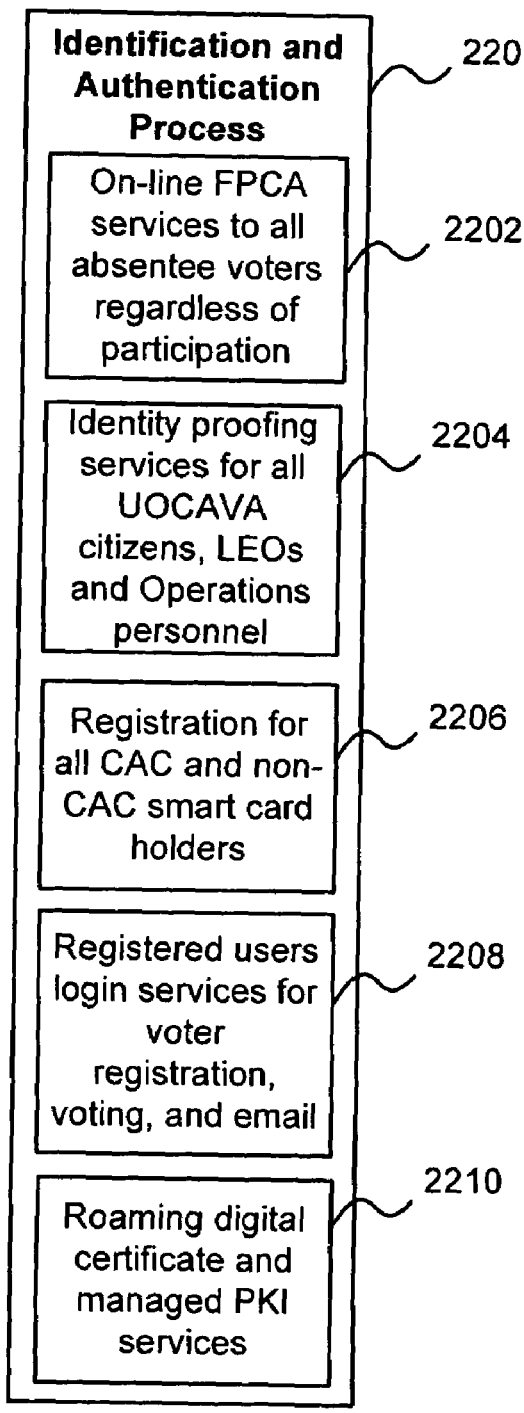
FIG. 2c shows a detailed view of the identification and authentication processes 220, according to an embodiment of the present invention.

FIG. 2c shows a detailed view of the identification and authentication processes 220, according to an embodiment of the present invention. The identification and authentication subsystem and processes provide a security layer to all other processes of the central hosting facility. The identification and authentication processes 220 require that any user or local election office official provide proper identification before they are given access to additional services within the central hosting facility 100, as shown in FIG. 1. Identification and authentication processes 220 include on-line Federal Postcard Application ("FPCA") services to all absentee voters regardless of participation 2202; identity proofing services for all Uniformed and Overseas Citizens Absentee Voting Act ("UOCAVA") citizens, local election offices ("LEOs"), and operations personnel 2204; registration for all Department of Defense ("DoD") Common Access Card ("CAC") and non-CAC smart card holders 2206; login services for voter registration, voting, and email for registered users 2208; and roaming digital certificate and managed Public Key Infrastructure ("PKI") services 2210.

On-line FPCA services 2202 allows any authorized user to access and complete an FPCA in order to register as a voter, whether or not they intend to vote using the secure on-line registration and voting solution of the present invention. Identity proofing services 2204 provides the services necessary for a user of the secure on-line registration and voting system to complete and submit information necessary to prove their identity. Registration for all DoD CAC and non-CAC smart card holders 2206 provides registration services specific to those with Department of Defense credentials and services specific to those with out. Login services for voter registration, voting, and email for registered users 2208 provides the login services necessary to access specific services. Roaming digital certificate and managed Public Key Infrastructure ("PKI") services 2210 provides the security services protecting access to the secure on-line registration and voting solution, as well as specific document generated throughout the registration and voting processes.

Figure 2D:
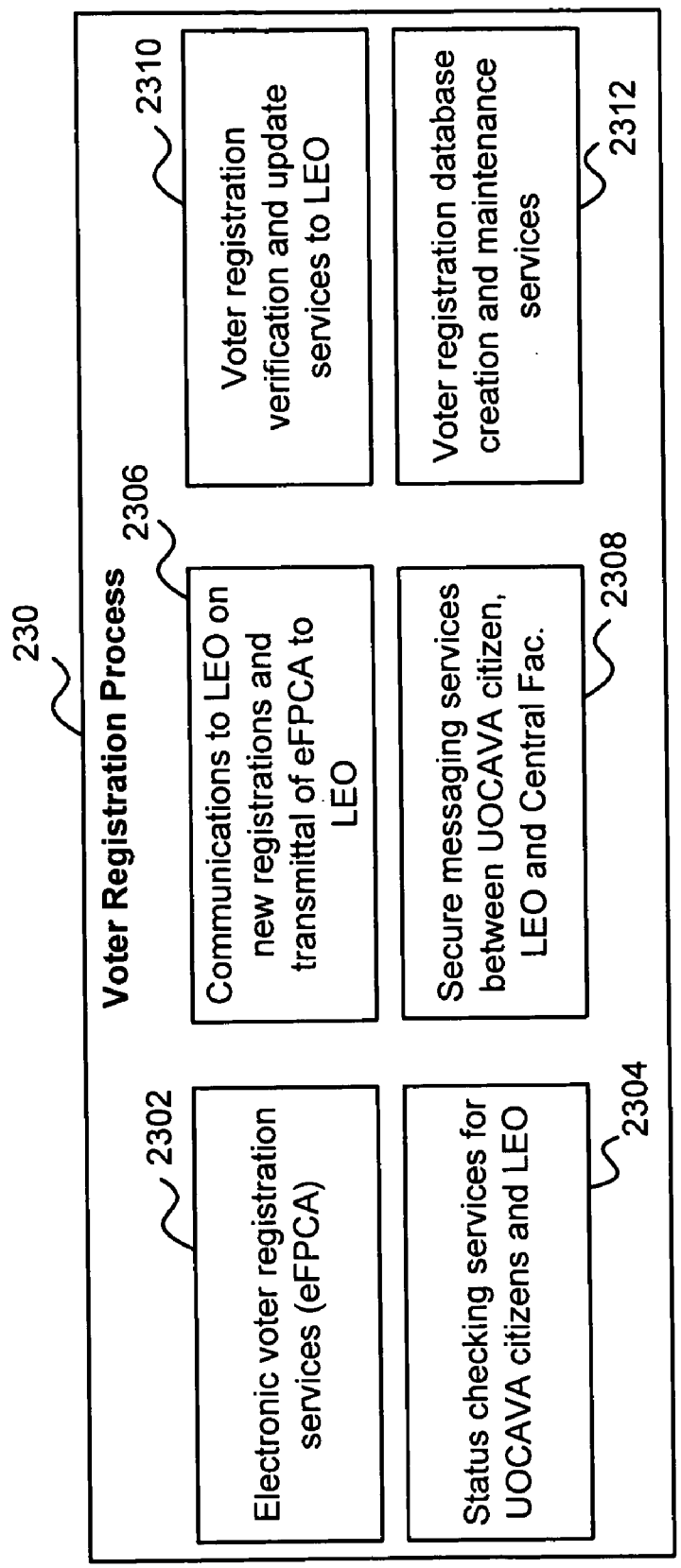
FIG. 2d depicts a detailed view of the voter registration processes, according to an embodiment of the present invention.

FIG. 2d shows a detailed view of the voter registration processes 230, according to an embodiment of the present invention. Voter registration processes 230 include providing electronic voter registration services and absentee ballot requests through electronic Federal Postcard Application ("eFPCA") 2302; status checking services for UOCAVA citizens and LEOs 2304; communications to LEOs on new registrations and transmittal of eFPCA to LEOs 2306; secure transmission services between UOCAVA citizen, LEO and central hosting facility 2308; voter registration verification and update services to LEOs 2310; and voter registration database creation and maintenance services 2312.

Electronic voter registration services and absentee ballot requests through eFPCA 2302 provide the processes for requesting and submitting an eFPCA. Status checking services for UOCAVA citizens and LEOs 2304 allows those with the proper authorization to check the status of various processes within the secure electronic registration and voting solution. Communications to LEOs on new registrations and transmittal of eFPCA to LEOs 2306 provides the automatic generation and sending of communications upon the receipt of registration and eFPCA submission. Secure transmission services between UOCAVA citizen, LEO, and central hosting facility 2308 provides the processes to ensure secure communications among authorized users. Voter registration verification and update services to LEOs 2310 provides ability to verify information contained on a registration application and provide status information to users submitting registration applications. Voter registration database creation and maintenance services 2312 provides the ability to create, update and maintain a database assigned to a local election office for the purpose of maintaining voter registration information.

Figure 2E:
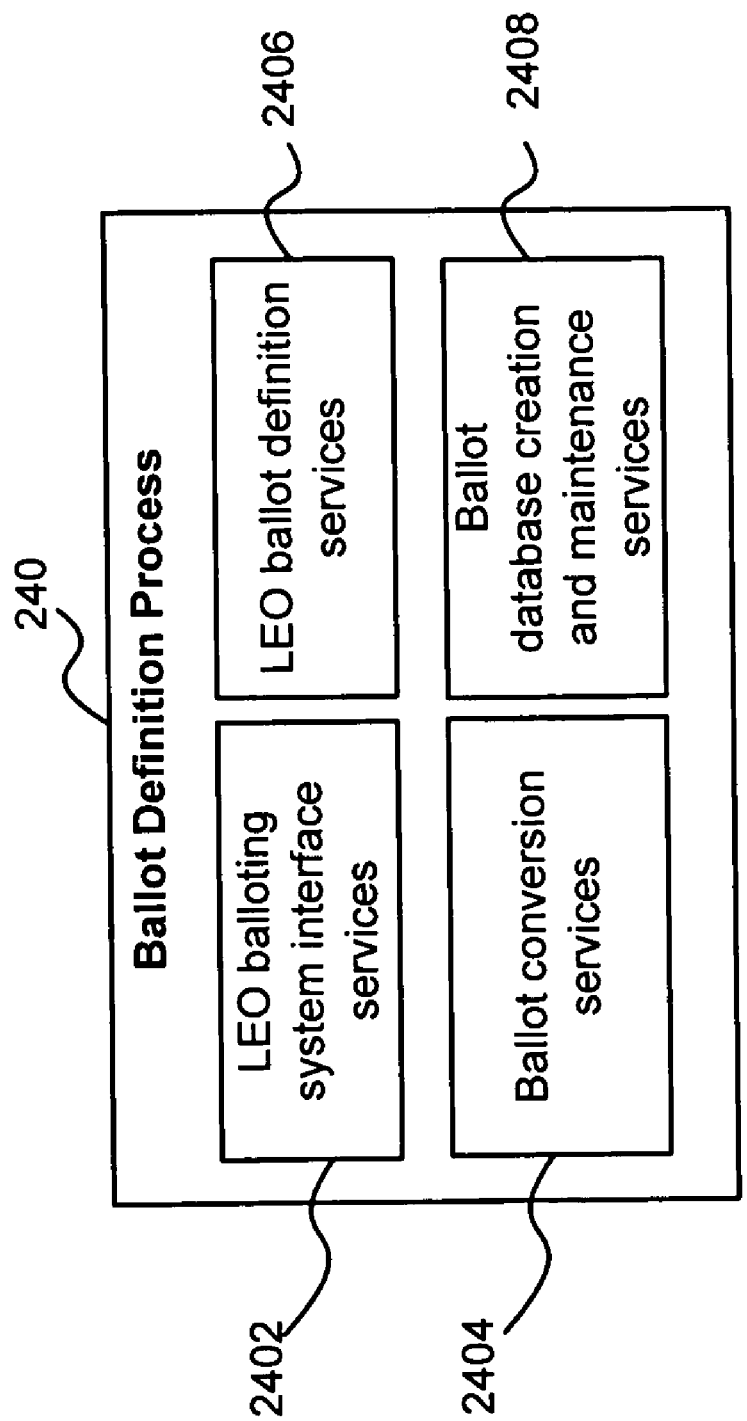
FIG. 2e depicts a detailed view of the ballot definition processes, according to an embodiment of the present invention

FIG. 2e shows a detailed view of the ballot definition processes 240, according to an embodiment of the present invention. Ballot definition processes 240 include providing LEO balloting system interface services 2402; central voting facility ballot conversion services 2404; LEO ballot definition services 2406; and central voting facility ballot database creation and maintenance services 2408.

LEO balloting system interface services 2402 provides a user interface for creating or submitting a ballot definition file. Central voting facility ballot conversion services 2404 allow for the conversion of a ballot definition file to a ballot for use by a voter. LEO ballot definition services 2406 provides the tools used by a local election official to generate a ballot definition file locally and upload the file to the central hosting facility, or directly on the central hosting facility. Central voting facility ballot database creation and maintenance services 2408 provides the necessary processes for the creation and maintenance of a local election office's ballot database.

Figure 2F:
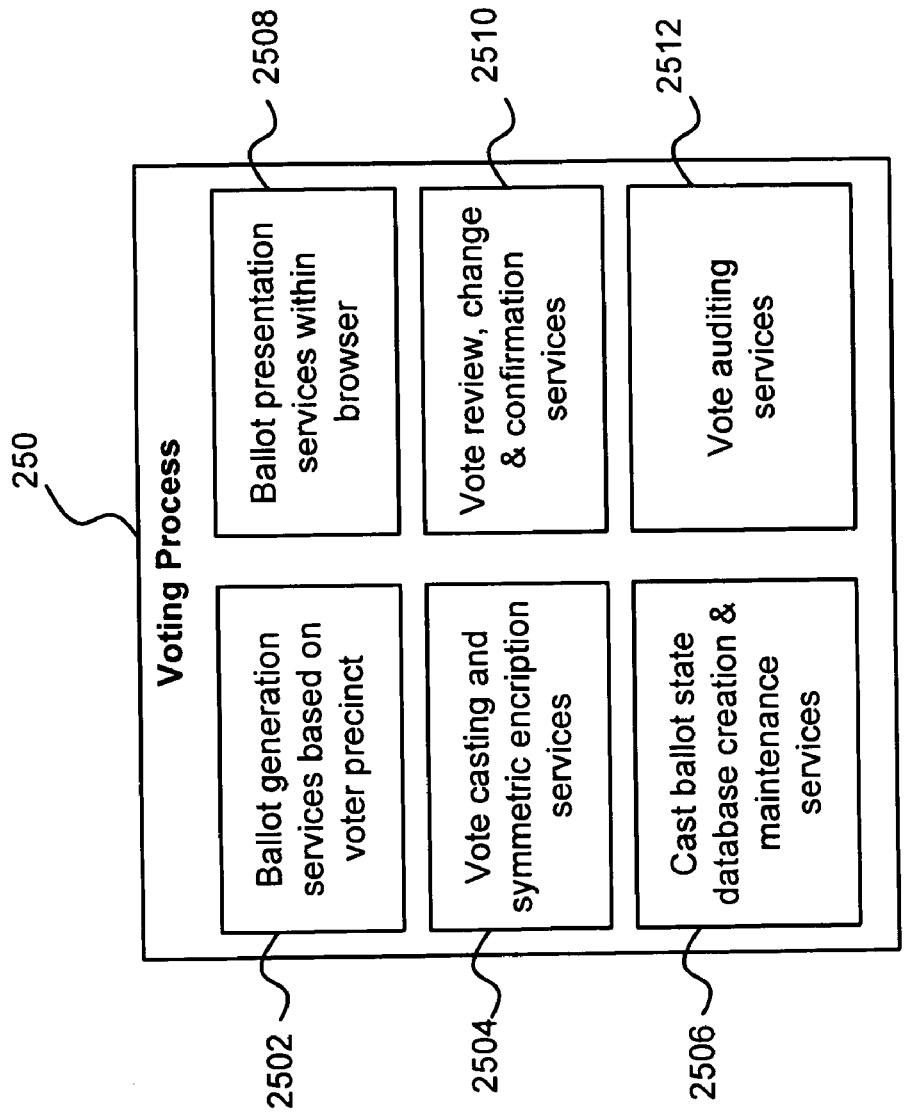
FIG. 2f depicts a detailed view of the voting processes, according to an embodiment of the present invention.

FIG. 2f shows a detailed view of the voting processes 250, according to an embodiment of the present invention. Voting processes 250 include providing ballot generation services based on voter precinct and/or precinct split 2502; vote casting and symmetric encryption services 2504; cast ballot state database creation and maintenance services 2506; ballot presentation services within browser 2508; vote review, change and confirmation services 2510 and vote auditing services 2512.

Ballot generation services based on voter precinct and/or precinct split 2502 generate ballots for voters based on the ballot definition file submitted by the local election office and the rules associated with the precincts of the local election office. Vote casting and symmetric encryption services 2504 manages the voting and encryption of the ballot and the voter's symmetric key once the ballot has been cast and confirmed. Cast ballot state database creation and maintenance services 2506 manages the creation and maintenance of the ballot database. Ballot presentation services within browser 2508 ensure accurate presentation of a voter's ballot within their browser. Vote review, change and confirmation services 2510 manages the voter's review of a cast ballot and ensure changes are accurately reflected on the final ballot, as well as ensuring that voter's confirm all completed ballots. Vote auditing services 2512 tracks the actions of a voter to ensure that all voting rules are complied with during the voting process, as well as allowing for the generation of auditing reports.

Figure 2G:
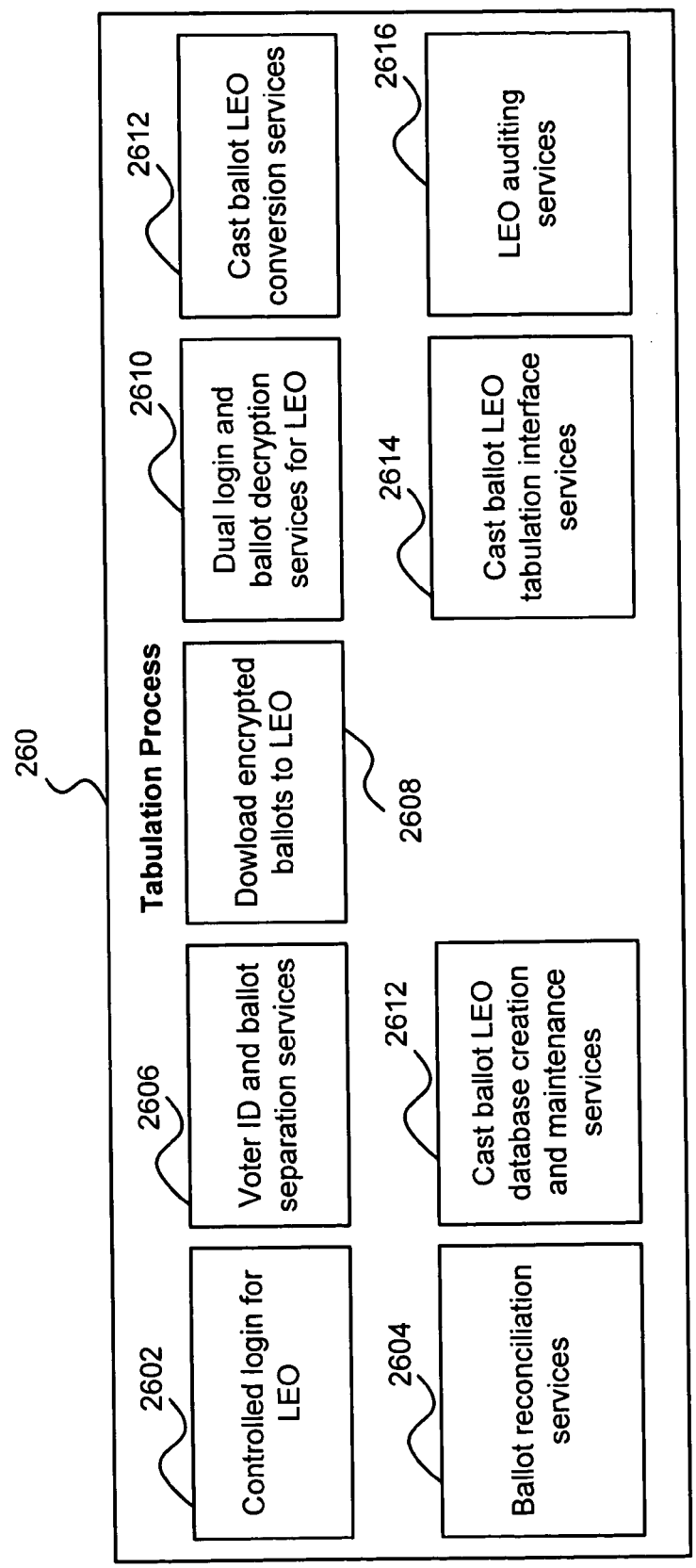
FIG. 2g depicts a detailed view of the tabulation processes, according to an embodiment of the present invention.

FIG. 2g shows a detailed view of the tabulation processes 260, according to an embodiment of the present invention. Tabulation processes 260 include providing controlled login for LEO official 2602; ballot reconciliation services 2604; voter ID and ballot separation services 2606, and download to local election office computer of encrypted ballots 2608, where the local computer provides ballot decryption services for LEO 2610; cast ballot LEO conversion services 2612; cast ballot LEO database creation and maintenance services 2612; cast ballot LEO tabulation interface services 2614; and LEO auditing services 2616.

Controlled login for LEO official 2602 ensures that local election officials follow proper login procedures. Ballot reconciliation services 2604 allow reconciliation of the ballots cast with the registered users that voted. Voter ID and ballot separation services 2606 separates each voter's identification information from their ballot prior to download and tabulation to ensure voter anonymity. Download to local election office computer of encrypted ballots 2608 ensures that encrypted ballots are accurately transferred to the local election office's computer for tabulation. Ballot decryption services for LEO 2610 are housed on the local election office computer and provides for the decryption of the user's key and the ballot. Cast ballot LEO conversion services 2612. Cast ballot LEO database creation and maintenance services 2612 provides services for creation and maintenance of the local election offices database for cast ballots. Cast ballot LEO tabulation interface services 2614 provides the user interface for tabulating the cast ballots. LEO auditing services 2616 provides services for auditing the balloting process.

In operation, the present invention provides the various methods and processes associated with a secure electronic registration and voting system. For example, the present invention allows for the identification and authentication of voters and local election office workers; the registration of voters; the creation of ballot definitions; voting and securing a ballot; and ballot tabulation.

Figure 3:
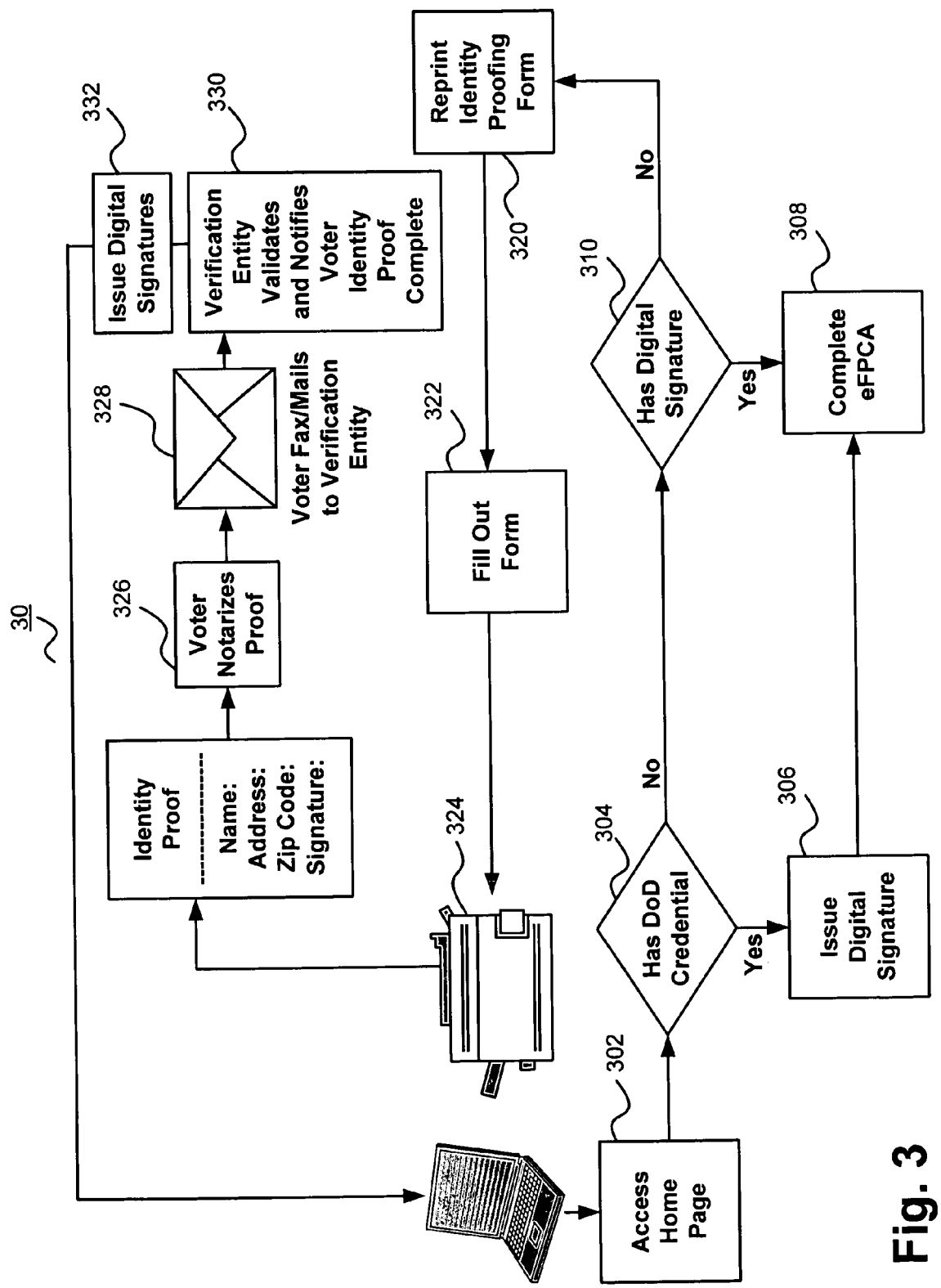
FIG. 3 depicts a process flow diagram for the identification and authentication process of the electronic registration and voting solution according to an embodiment of the present invention.

FIG. 3 shows a process flow diagram for the identification and authentication processes of the electronic registration and voting solution, according to an embodiment of the present invention. The identification and authentication process 30 begins in Step 302 when a user accesses the home page of the central hosting facility. A user may be a voter or potential voter. Through a web page from the home page a user may also check to see if their voting jurisdiction allows for participation in the on line voting process.

If a user is in a jurisdiction allowing on-line voting, the user confirms whether or not he/she has a DoD CAC credential in Step 304. If a user has a DoD credential, a roaming digital PKI certificate for use as a digital signature is assigned to the user in Step 306. Once the user obtains a digital certificate, he or she may then request and complete an eFPCA form in Step 308.

For a user that does not have a DoD CAC credential, the user may provide a previously secured digital signature in Step 310. If the user provides a digital signature in Step 310, the user is permitted to request and complete the eFPCA form in Step 308. For a user that can not provide a DoD CAC credential in Step 304, nor can provide a digital signature in Step 310, an identity proofing form is provided to the user in Step 320.

The user then fills out in Step 322 and prints the identity proofing form on the user's printer in Step 324. The user may then have the form notarized in Step 326, and forward it to a validation entity in Step 328. The validation entity confirms the accuracy of the information provided in Step 330. Upon the proper completion and validation of the identity proof, the validation entity notifies the user and issues to the user a roaming digital PKI certificate in Step 332. The roaming certificate is the user's digital signature for use with the central hosting facility. After receipt of the certificate, the user may request and complete an eFPCA form as previously described.

Once a roaming digital certificate is issued, the user may gain access to the central hosting facility using a user ID, password, and challenge questions. The digital certificate is not user computer specific. Therefore, a user can access the central hosting facility with the acquired digital certificate from any computer.

Election officials are also provided a digital certificate for use with the central hosting facility. The digital certificate and access capabilities assigned to a particular election official are based upon an official's status and need for access to the various processes of the online election system.

Figure 4:
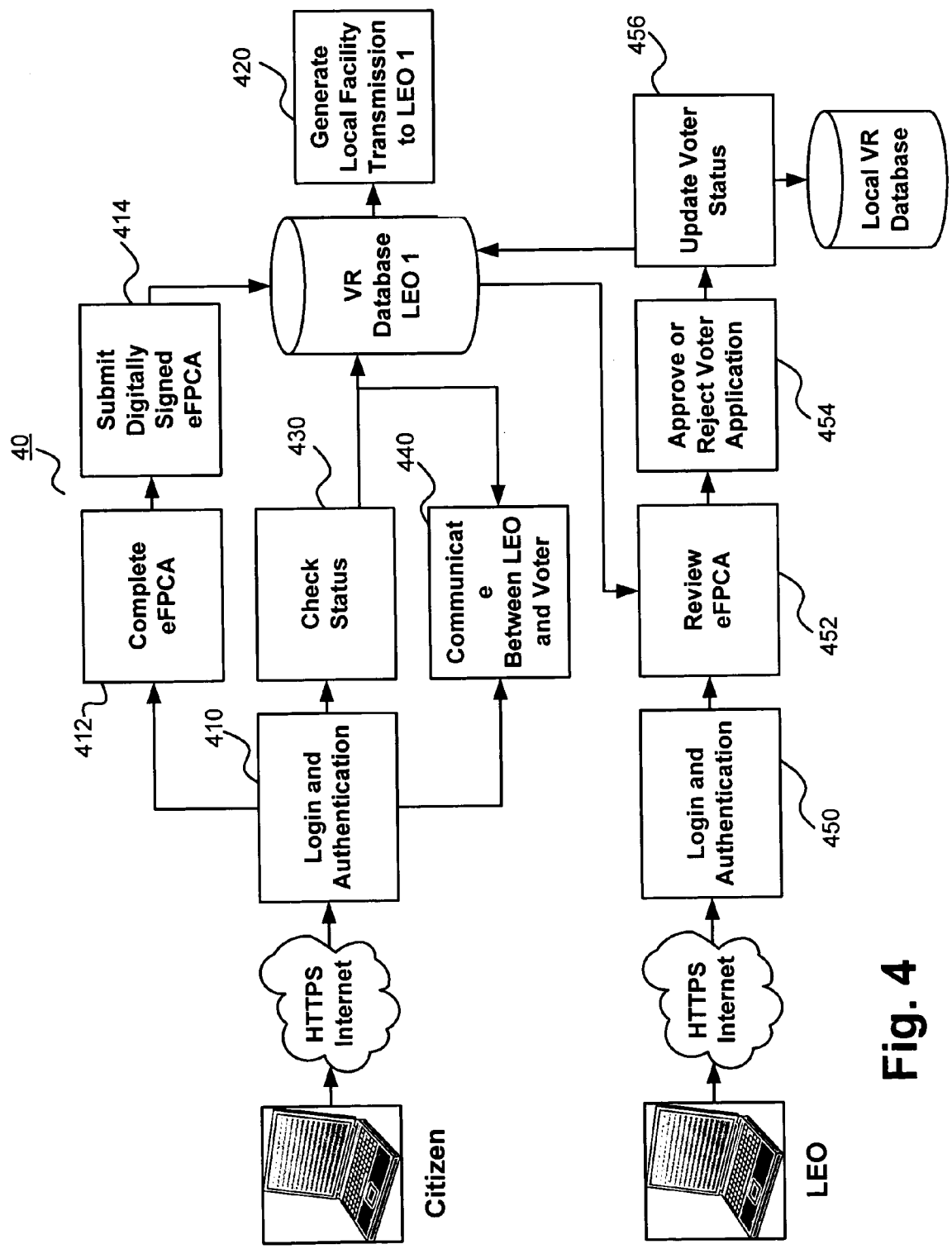
FIG. 4 depicts a process flow diagram for the voter registration process of the electronic registration and voting solution according to an embodiment of the present invention.

FIG. 4 shows a process flow diagram for the voter registration process of the electronic registration and voting solution according to an embodiment of the present invention. The registration process 40 begins when a user, who has previously received a digital certificate, logs in and authenticates them self with the central hosting facility in Step 410.

Once a user is properly identified and authenticated, the user may register to vote with and/or request an absentee ballot from their local election office by completing an eFPCA in Step 412 and submitting the eFPCA signed with the user's digital certificate Step 414 to the central hosting facility. The central hosting facility forwards the registration information to the user's local election office in Step 420. Where required and according to State law the user may also be advised to print and submit a hard copy of the FPCA with the user's signature.

After submitting a voter registration application (for example, an absentee voter application), a user may also login Step 410 and check the status of the application in Step 430. The LEO may also communicate status information to the voter Step 440.

The local election office's review of an eFPCA submitted by a user begins when a local election official logs in and authenticates himself in Step 520. A local election office can then retrieve and review the registration application in Step 452. At this point, the local election official may approve or deny the user's application in Step 454. After the review and approval/denial process, the local election official updates the user's status in Step 456 and provides registration information for an approved user to the central hosting facility's voter registration database, as well as the local voter registration database.

In each instance that there is activity at the central hosting facility voter registration database, a communication is generated and sent to the local election office in Step 420.

Figure 5:
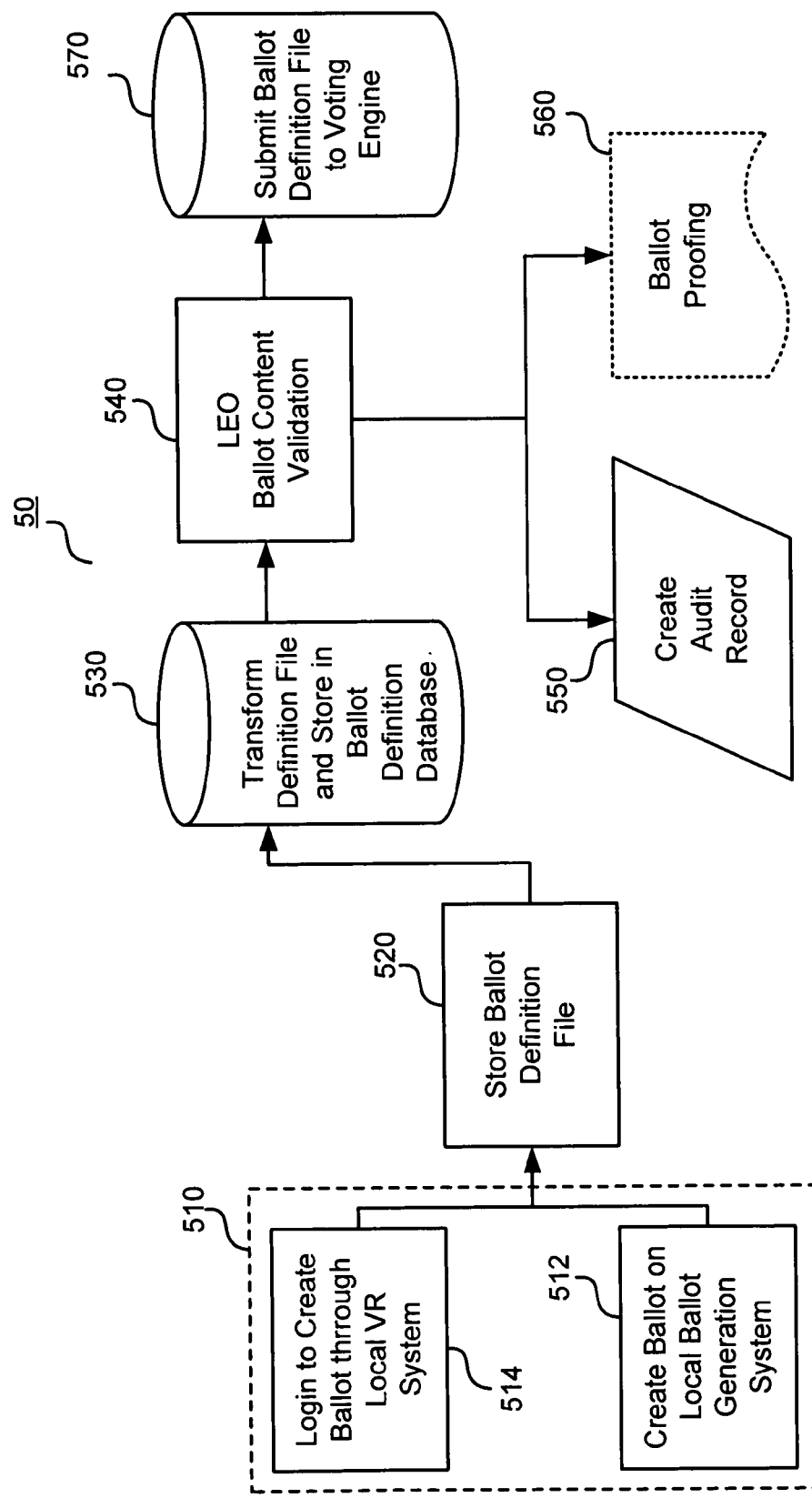
FIG. 5 depicts a process flow diagram for the ballot definition process of the electronic registration and voting solution according to an embodiment of the present invention.

FIG. 5 shows a process flow diagram for the ballot definition process of the electronic registration and voting solution, according to an embodiment of the present invention. A local election office uses the ballot definition process to create ballots specific to that jurisdiction's races and local ballot requirements. The ballot definition process 50 begins with the local election officials preparing a ballot definition file in Step 510. The definition file defines, for example, the races associated with an election, the candidates, precincts, precinct splits, and any other information and formatting information necessary to create a ballot.

The ballot definition file may be created offline and imported to the central hosting facility in Step 512 or a local election official may log on to the central hosting facility and create the ballot definition file online in Step 514. After either of the ballot creation methods, the ballot definition file is stored on the central hosting facility. Once the central hosting facility collects a definition file, it is transformed into a standard format specified by the central hosting facility and stored in a ballot definition database in Step 530.

The ballot then goes through a ballot content validation process by the local election official in Step 540. The validation process allows for the creation of an audit record in Step 550 or ballot proofing in Step 560. The ballot is then provided to the voting engine in Step 570 for use with registered voters.

The ballot definition process 50 provides the local election offices with the capability to validate the transformed ballot content, associate ballot types with precincts, and apply local election voting rules, such as random sorting of candidates, to their ballots. The central hosting facility also provides for a complete audit trail of the ballot and ballot definition process.

Figure 6:
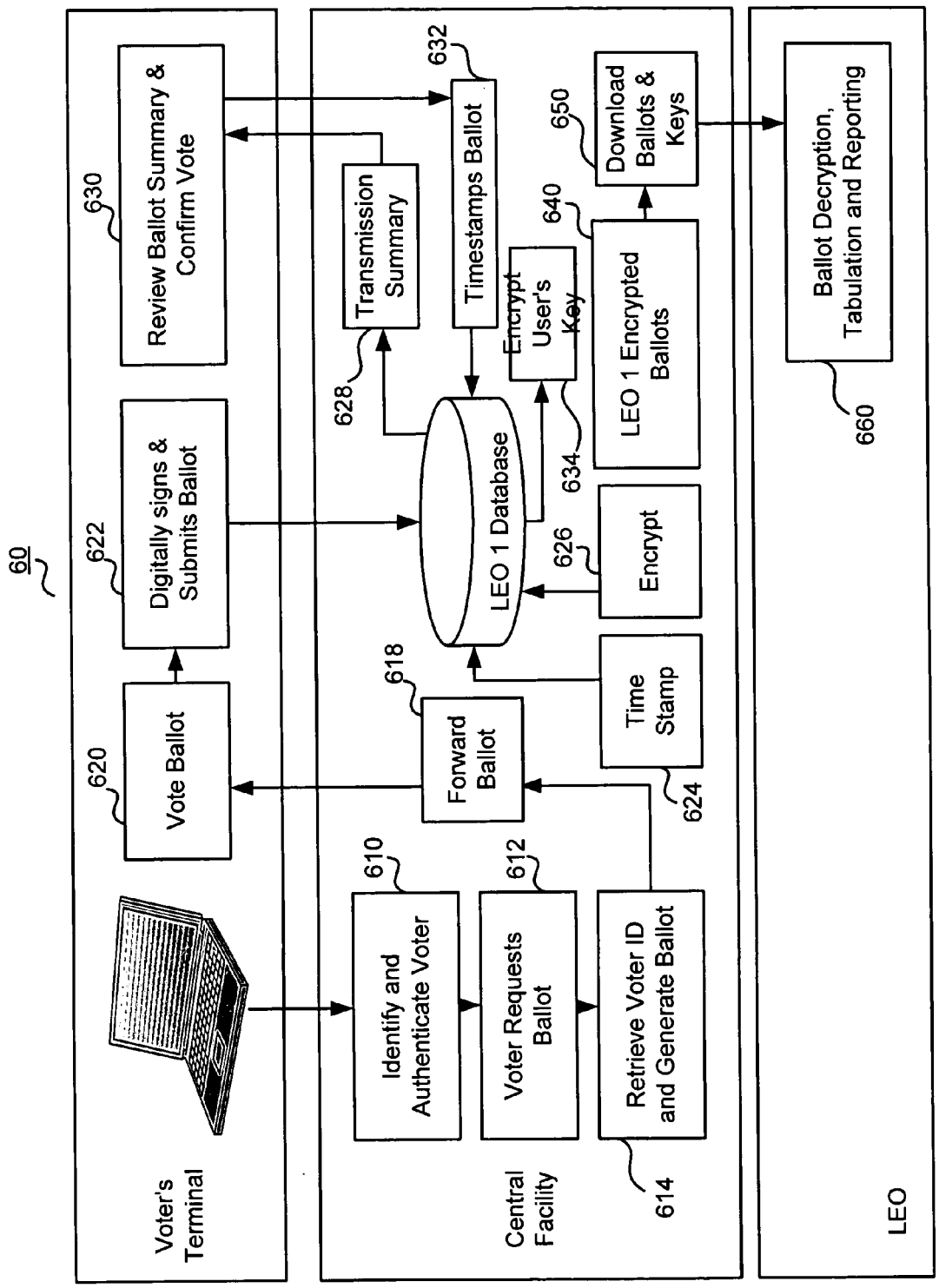
FIG. 6 depicts the process flow for voting and securing a ballot according to an embodiment of the present invention.

FIG. 6 shows the process flow for voting and securing a ballot, according to an embodiment of the present invention. The voting process 60 begins with a user logging into the central hosting facility by identifying and authenticating himself or herself as a valid voter in Step 610. Once a user has been properly identified and authenticated in Step 610, the voter may then request a ballot Step 612. Upon this request, a ballot is generated in Step 614 based on the voter's registration information, precinct information, and ballot style and definition. For security purposes, the server generating the ballot will also digitally sign the ballot.

The ballot is then provided to the voter in Step 618 and the voter may enter his or her choices on the ballot in Step 620. After voting is completed, the user digitally signs the ballot using the roaming digital certificate and submits the ballot back to the central voting system in Step 622.

When the central hosting facility receives the completed ballot, it is time stamped in Step 624 and encrypted in Step 626 with the user's symmetric key. A summary of the voter's choices is then transmitted back to the voter in Step 628. This retransmission provides the voter with an opportunity to review their choice set from the ballot and confirm their vote in Step 630. Upon digitally signed confirmation by the voter, the central hosting facility time stamps the ballot in Step 632, encrypts the symmetric key using the local election office's public key in Step 634, and stores the encrypted ballot and associated encrypted symmetric key in the electronic ballot box of the voter's local election office in Step 640, thus ensuring that only the local election office can view the voter's choices.

After a ballot is placed in the electronic ballot box in Step 640, the local election office may perform a ballot reconciliation process, download the ballot or ballots located in the electronic ballot box in Step 650, decrypt the ballot or ballots using the assigned security keys, tabulate the results, and prepare reports based on the tabulation in Step 660.

The balloting process 60 according to the present invention provides a secure voting capability. The balloting process 60 ensures that ballots in the electronic ballot box are received securely and intact. Voters are provided an opportunity to verify their votes and only designated local election officials of the voter's local election office will have the proper security keys necessary to decrypt the ballot.

Figure 7:
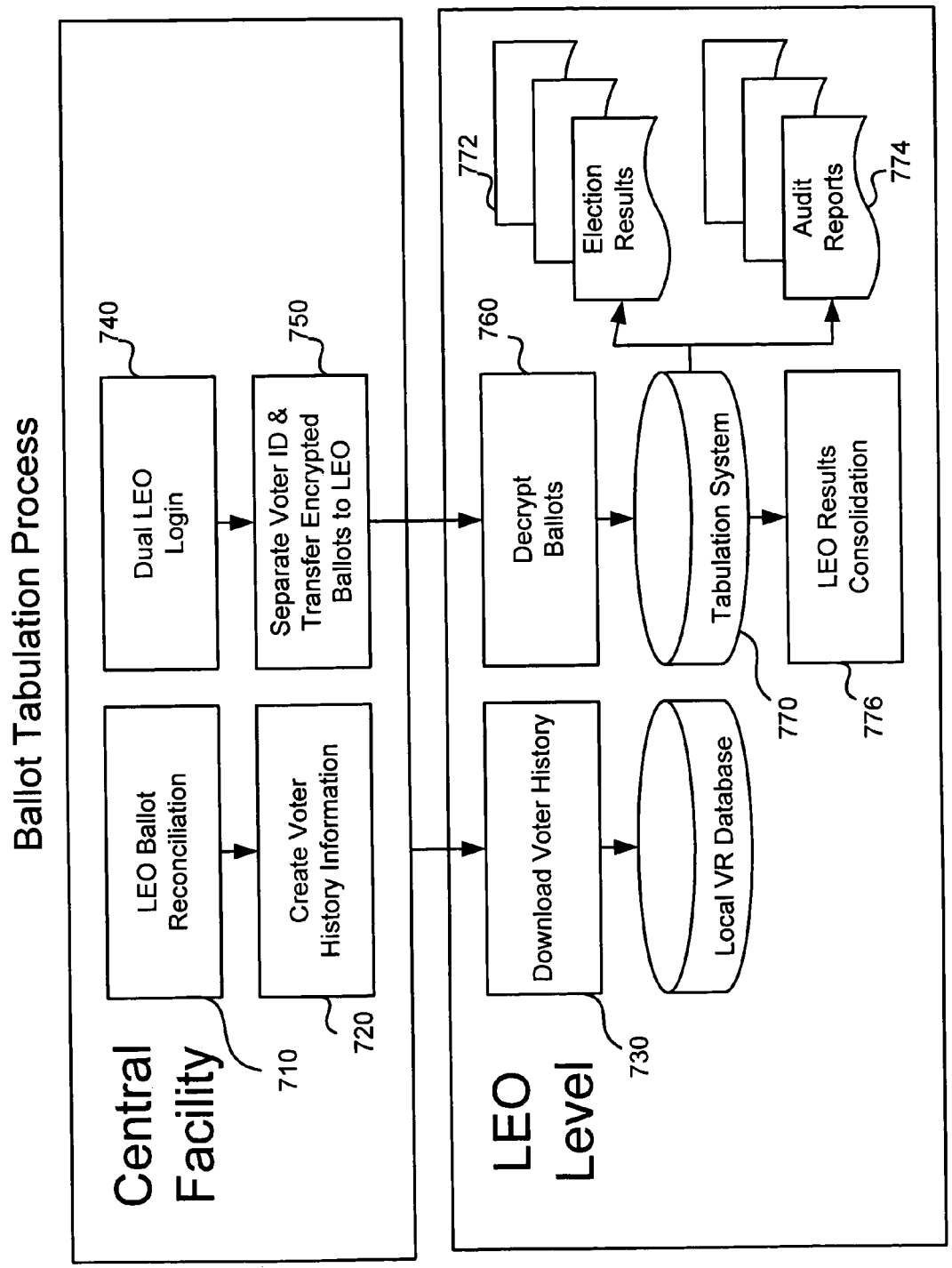
FIG. 7 depicts a process flow diagram for the ballot tabulation process of the electronic registration and voting solution according to an embodiment of the present invention.

FIG. 7 shows a detailed view of the process flow for the ballot tabulation process of the electronic registration and voting system, according to an embodiment of the present invention. The tabulation process of the central hosting facility provides the ability for the local election office to reconcile the ballots in Step 710 submitted during the election process. Reconciliation allows the local election office the opportunity to confirm that the voters participating in the election followed local election rules, such as following proper voting procedures with respect to the time of voting. Voter eligibility may also be confirmed. For example, fraudulent use of a deceased voter's information can be identified during the reconciliation Step 710. The central hosting facility also creates a voter history in Step 720 and allows the local election office to download and store the voter history in the local election office voter registration database in Step 730.

The ballot tabulation process also includes various security measures to ensure fair and accurate ballot tabulation. According to an embodiment of the present invention, a token and a computer are provided to the local election office for use during the ballot tabulation. Two or more local officials are designated for the tabulation process. A dual login is also required in Step 740 wherein one election official installs the token and logs into the local election office computer used for tabulation and the second official logs into the central hosting facility. After the dual login Step 730, voter IDs are separated from the encrypted ballots and the encrypted ballots are shuffled and then transferred to the tabulation computer Step 750.

The local election office may then disconnect the tabulation computer from the network and locally decrypt the ballots with the local election office decryption key in Step 760. The local election office decrypts each ballot by first decrypting a ballot's associated symmetric key using the local election office's public key, then using the associated symmetric key to decrypt the ballot. Once the ballots are decrypted, the local election office tabulation system can tabulate the ballots in Step 770, generate election results in Step 772, create audit reports in Step 774, and prepare a consolidated report of the results in Step 776.

In summary, the present invention provides a secure, online voting capability that allows any voter to register and cast their ballot according to the timeframe of a local election. The cast ballots are encrypted to provide security to the voters and their ballots. All ballots for a local election office are stored in the ballot storage associated with that local election office. Only officials from a voter's local election office may decrypt and tabulate their ballot.

Every event that takes place throughout the registration and voting process may be tracked and audited. Thus, an independent evaluation of all actions associated with an election is possible. Furthermore, ballot reconciliation according to the present invention allows the ability to flag suspect ballots and if necessary exclude them from tabulation until resolved by election officials. Ballot recounting is also provided through the repeatability of the reconciliation, download, decryption and tabulation processes.

Accordingly, it can be seen that the above description of the present invention discloses the use of a secure connection, such as HTTPS, between the user and a central voting server to transfer voting data. HTTPS is the secure version of HTTP, the communication protocol of the World Wide Web. It was invented by Netscape Communications Corporation to provide authentication and encrypted communication and is used in electronic commerce. Instead of using plain text socket communication, HTTPS encrypts the session data using either a version of the SSL (Secure Socket Layer) protocol or the TLS (Transport Layer Security) protocol, thus ensuring reasonable protection from eavesdroppers, and man in the middle attacks. The level of protection depends on the correctness of the implementation by the web browser and the server software and the actual cryptographic algorithms supported. By analogy, the voting server and user "shake hands" between transactions to confirm their respective identities to verify the security of the transaction. Where a security breach occurs, the handshake fails and the transaction is rejected.

Problems may arise where an unwanted intermediary operates between the user and server. The intermediary forms secure connections with both the user and the server, effectively performing a handshake between both parties. While this is a non-trivial task since the connection between the user and server is dynamically created, neither the user nor server will be aware of the interloper.

Figure 8:
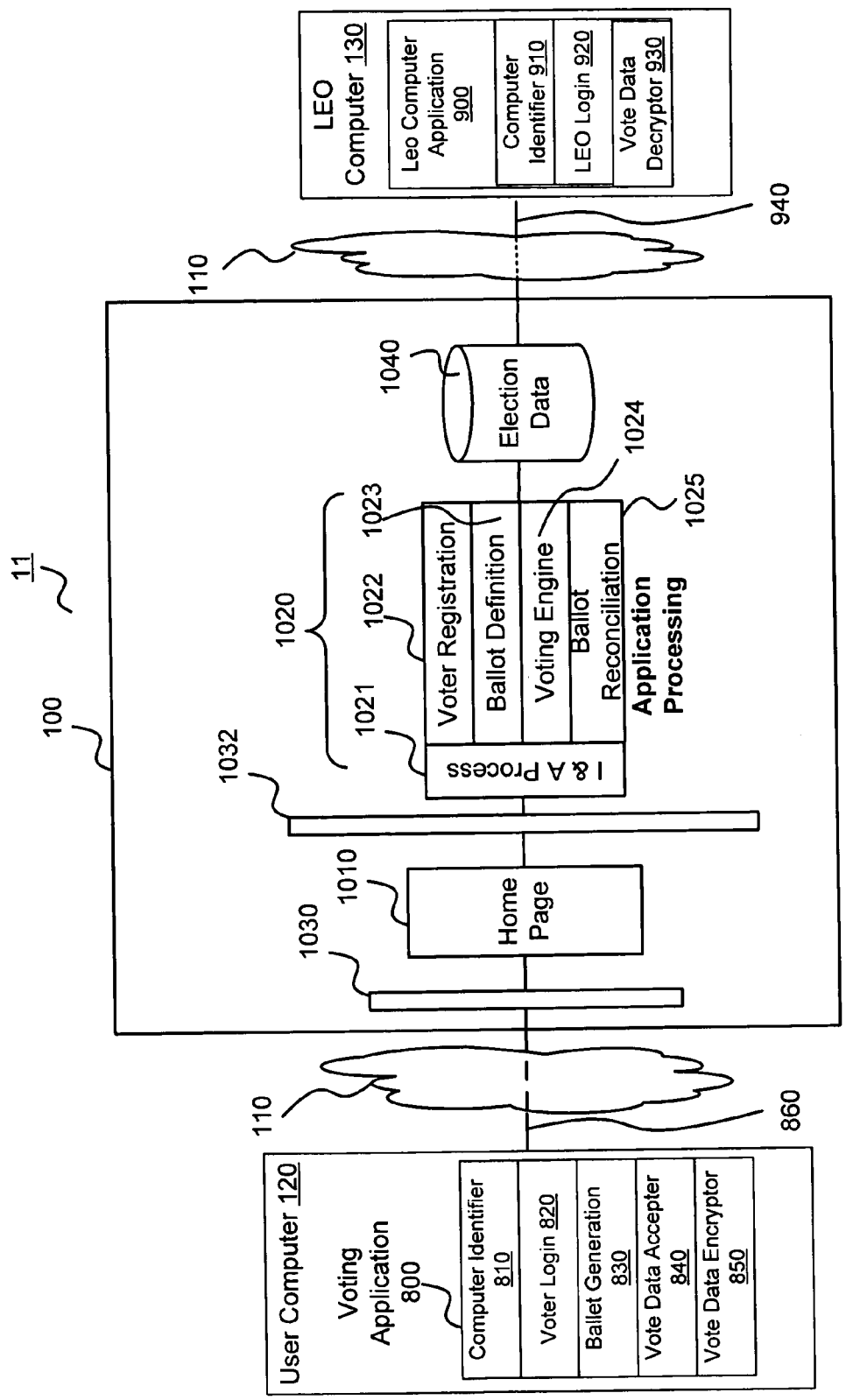
FIG. 8 depicts a secure electronic registration and voting solution system architecture according to another embodiment of the present invention.

In response to these and other needs invention, an alternative embodiment of the present invention depicted in FIG. 8, provides an alternative electronic registration and voting solution system architecture 11. The alternative electronic registration and voting solution system architecture 11 incorporates an internet application design that greatly complicates the task of developing hostile software that can manipulate a large number of transactions on unsecured PCs, thereby securing the PC. Essentially, the design 11 forces the hostile software to become complex and therefore large in size. This makes the hostile software much more vulnerable to detection when it attempts to replicate itself across the internet to millions of PCs. Its very size makes it very visible to Internet managers and internet security companies that monitor the Internet for such attacks. This embodiment was developed for an Internet voting system where voting could occur on any PC in the world but where the vote needed to be secure even though the voting workstation is not secure.

Turning back to FIG. 8, the system architecture includes a central secure hosting environment 1000 and a client-side application 800 on the user computer 120. The application 800, acquired when the user first accesses the voter website 1010, contains several sub-elements. The user application 800 includes some type of identifier 810, such as a cookie that identifies the computer to the server. A voter login application 820 acquires the user data and forwards this information to the server 1020 to acquire the ballot data. A ballot generator 830 uses this data to present a personalized ballot to the user, as described. The user's inputs are received by a vote data acceptor 840, and this data is then encrypted in module 850 and digitally signed to be sent over a secure connection 860. This information is decoded, processed and recoded by the application 1020 for storage in an encoded form in an election database 1040. An Election official (LEO) can access the stored data using an application 900 that logs (910) and identifies the LEO (920), the LEO can then acquire election data associated with the LEO (930) and decrypts this acquired information (940). Accordingly, it can be seen that this particular implementation of the present invention provides an improved security configuration in with multiple levels of security such that encoded voting data is securely forwarded from the remote voter and the voting data can be traced back to the remote vote since all voting data includes a notation of the computer identifier 810 and voter login data 820. In this way, it becomes extremely difficult to introduce false voting data since it would require replication of unique, acceptable combinations of computer and voter identifiers. Moreover, the connection is secure both ways, so that a user may not even access a ballot without authentication, a Also, the transmitted election voting is transmitted in a secure format over the connection 860 so that the voting data cannot be easily intercepted, read, and altered since each transmission of voting is separately encoded using unique combinations of computer and voter identifiers. Likewise, election data can be secured in a secure location 1040 in an encoded format where, only acceptable election officials with acceptable, unique combinations of computer and LEO identifiers. The election data 1040 is then encoded and forwarded to the LEO computer 130. Thus, it can be seen that the election data is secure and encoded at all times, with high levels of control on who can provide or access this data.

Figure 9:
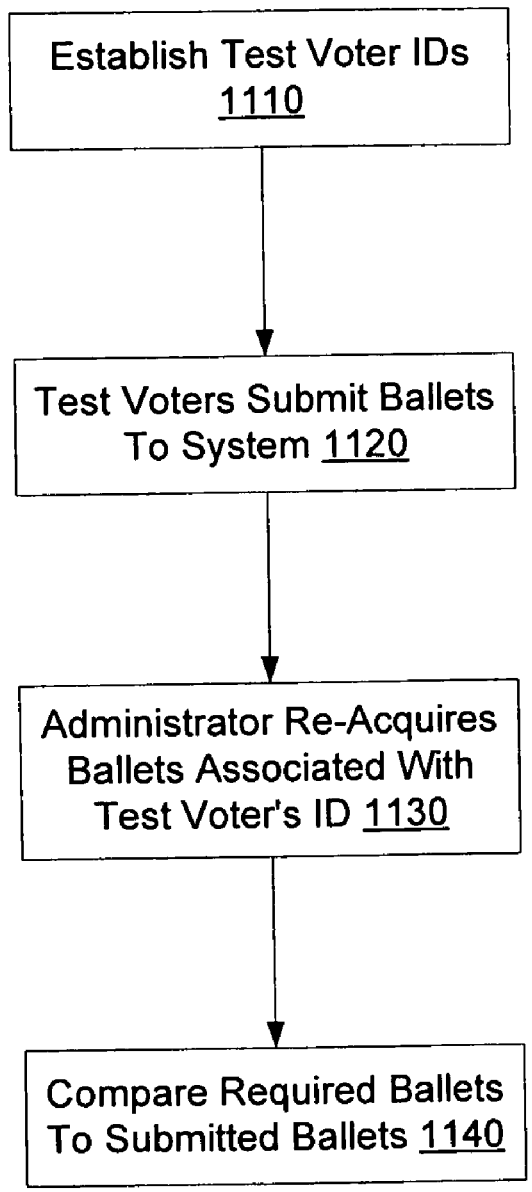
FIG. 9 depicts a process flow diagram for an election auditing methodology according to an embodiment of the present invention.

Referring now to FIG. 9, another embodiment of the present invention provides election officials with an election auditing methodology 1100 to verify that an Internet-based absentee voting system is correctly recording votes and provides evidence that no vote-tampering is occurring. The verification is designed to work during the voting, not just before or after as is typically the case with election process auditing procedures. This embodiment builds on the capabilities of above-described voting systems that allow a voter to vote anonymously even though the system can tie their identity to their completed electronic ballot. In this invention, election officials create and store test voter IDs that will allow test voters to vote on the voting system, step 1110. For example, the election officials may create a predefined number of fictitious test voter IDs. As described above, the voter identifiers allow a voter to log into the voting system, to acquire an appropriate ballot using the log-in, and then to submit voting data in response to the received ballot. Thus, the test voters submit their voter identifiers to the voting system to receive ballots, fill out these ballots, and submit the completed ballots using pre-specified election data in step 1120, as described above in connection with the voting system 10, 11. Typically, pre-specified ballot choices are associated with each of the test voter IDs, and these pre-specified ballot choices are stored for later comparison. Preferably, test voters should use a variety of workstations in different locations to cast their votes. For example, election official workstations should not be used, it should be workstations that will be typical of those used by real voters. In step 1130, after test voters vote these ballots, election officials can use the system's identification facilities to download these ballots separately and count them separately. For example, the election official can log-in through the LEO computer 130 to acquire election data 1040 associated with the test voter IDs created in step 1110. In step 1140, the election officials compare the acquired election results from step 1120 with these pre-specified ballot choices created in step 1120. If these counts match the pre-determined ballot counts, this testing serves as evidence that votes are being received correctly without tampering.

While these are "test" voter IDs, nothing in the system identifies them as such. Records identifying these voters are kept manually outside the system in an election official's offices. Thus, there is no identifier in the system that hackers can use to segregate these votes from others and thereby not "hack" these votes to hide their activities. The innovation further protects voters by asking each voting jurisdiction to uniquely identify their own lists of test voter IDs. Having independent, geographically dispersed officials creating independent sets of test IDs greatly complicates an attacker's problem set and thereby improves the value of a successful test as an indicator of a tamper-free election.

Figure 10:
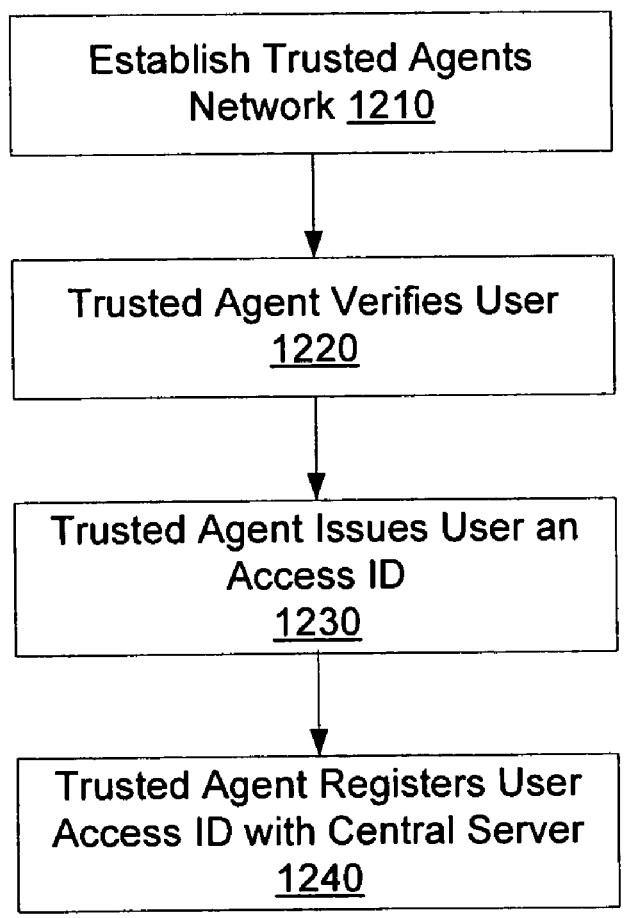
FIG. 10 depicts a process flow diagram for an trusted agent identification methodology according to an embodiment of the present invention.

Turning now to FIG. 10, another embodiment of the present invention provides a process design, implemented by software to support remote, in-person authentication of identity using a paperless process, step 1200. In particular, this embodiment allows business applications requiring high levels of authentication to distribute authenticated digital certificates to potential users who present themselves to a trusted agent. Trusted agents themselves have digital certificates which they use to electronically sign the user's application and verify that identity as presented meets.

Medium level assurance systems require an in-person authentication of identity before system credentials can be assigned to a user. This can present a major barrier to ease of use when potential users are highly dispersed and part of the general public rather than being a member of a large organization. (for example, users of an online banking site) The innovation of this embodiment was developed to support the remote authentication of voter registration and absentee ballot request applicants who were located all over the world, but has application in other fields. The first step is to set up a network of trusted agents who are themselves authenticated and receive digital certificates from the system, step 1210. Since these individuals must also be geographically dispersed to meets the needs or the equally dispersed target users, the embodiment includes methods for authenticating these individuals without requiring travel to a central location. Once the network of trusted agents is established, potential users present themselves to these agents to have their identity authenticated, step 1220. In step 1220, the user may provide identifying data or other known authentication criteria to the Trusted agent network. The agents then issue and certificates to the authenticated users, step 1230.

In steps 1230 and 1240, the agents generally transfer the certificate to the user and the central server using some type of known secure transfer method, as described above, such as SSH (Secure SHell), a protocol for remotely logging into a machine via a shell. SSH is very similar in functionality to telnet, however unlike telnet, all data between the client and server is encrypted. As described above, the internet was not created with security in mind and most of the traditional ways of communicating between computers do very little to protect that data. Telnet, ftp, and even email all send a username and password over the network in clear, unencrypted text. When a user telnets to a remote machine, the information is not sent directly to that machine, it is routed through several machines to get there. In this way, the internet is a lot like a highway system, since the user cannot take one road directly somewhere but instead requires the user to use several connecting roads. This causes some problems as anyone along the way can easily see what the user is sending, much like a person at a rest stop can watch a car go by on the freeway. This means someone can easily grab a username and password to system, and with this data, they are free to access the central system through the users stolen account data. Once this happens, the system is no longer secure, and files may be modified or deleted or someone may attempt to gain root access to the system where they can do severe damage. To protect the user's voting account and system from this threat, a preferred embodiment may require the use of SSH instead of telnet. This is the first step in preventing any passwords from being transmitted in clear text over the network. Since SSH encrypts all traffic with a public-private key scheme, only a central server can decrypt it and anyone who intercepts the data in transit will have only garbage data.

In another implementation, SCP, or Secure CoPy, may be employed. SCP is a protocol to allow the transmission of files from one machine to another with the encryption benefits of SSH The users can then use these certificates to access the system and legally sign documents electronically. In the case of internet voting, citizens use the certificates to sign their voter registration applications and their absentee ballots. It can be seen that this methodology eliminates the burden of logging the user from the central server. Instead, the trusted network agents administer access to the central server. Thus, the security on the trusted agent network may be altered as needed for adequate protection without effecting the operation of the central server. This configuration further adds additional security to a network by thwarting point of source attacks by hackers on either the trusted network or the central server. Specifically, a hacker would need to defeat security on two distinct networks, which is a non-trivial task.

Figure 11:
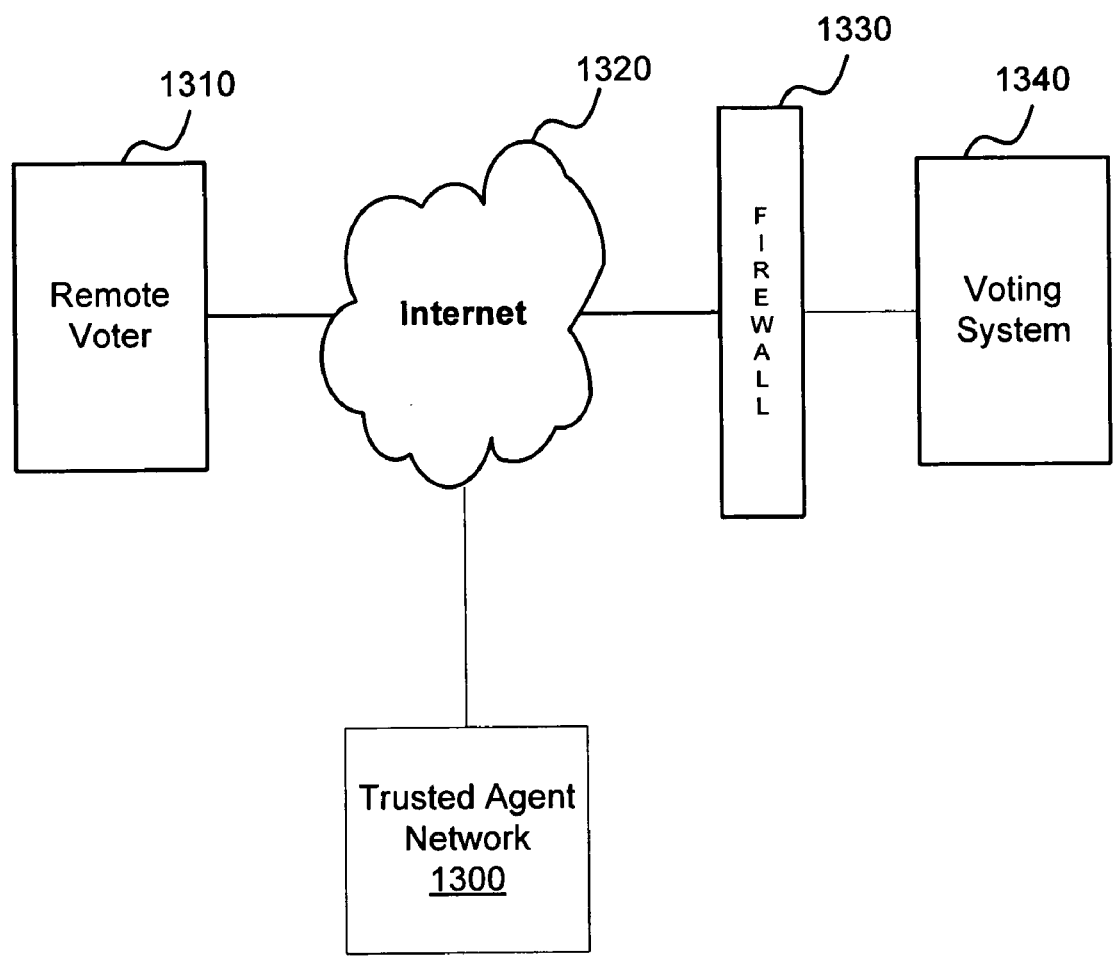
FIG. 11 depicts a trusted agent identification system architecture according to another embodiment of the present invention.

Turning now to FIG. 11, a trusted network 1300 may be connected to a network 1320, thereby receiving access to both a remote voter or user 1310 and the central secure hosting environment 1340 behind a firewall 1330. As described above, all communication between the trusted network 1300 and both the user 1310 and the central secure hosting environment 1340 are secure. Furthermore, subsequent communications from the user 1310 and the central secure hosting environment 1340 are secure, using the digital certificate provided by the trusted network 1300, as described in detail above. As seen above, the trusted network essentially allows a trusted intermediary to register remote voters and to authenticate the remote users password login and computer identifier so that the voter, as the remote user 1310, may pass the firewall 1330 as needed to connect to a voting system at the central secure hosting environment 1340 to obtain the ballot and to forward voting data.

It will be apparent to those skilled in the art that various modifications and variations can be made in the present invention without departing from the spirit or scope of the invention. Thus, it is intended that the present invention cover the modifications and variations of this invention provided that they come within the scope of any claims and their equivalents.

The invention claimed is:

1. An automated identity authentication and voting system comprising:

a computer for allowing a user to access an authentication system and a central hosting facility through a network, wherein the authentication system performs identity proofing and assigns a roaming digital certificate to the user in response to the user submitting an approved credential and registers the user to vote with the central hosting facility by completing an electronic application and digitally signing the application with the assigned roaming digital certificate, and wherein the central hosting facility comprises:

a system web server for housing a home page and web pages, a data storage device, and an application processing segment including:

a ballot creation subsystem for creating a ballot definition file by an official of the local election office, transforming the ballot definition file to a standard format, validating the ballot by the local election official, and providing the ballot for use by the user, a voting subsystem for providing secure voting by identifying and authenticating a user that logs in to vote and request a ballot, retrieving the user's identification information and digital certificate, generating a ballot from the user's local election office ballot definition file, digitally signing the ballot, sending the ballot to the user, receiving from the user the completed ballot digitally signed with the user's roaming digital certificate, time stamping the ballot, encrypting the ballot with a user's symmetric key, and storing the encrypted ballot, transmitting a ballot summary to the user for confirmation, receiving confirmation, time stamping the ballot and encrypting the user's symmetric key with the local election office's public key, and storing the encrypted symmetric key and associated encrypted ballot, and a ballot tabulation and reconciliation subsystem and associated processes for reconciling encrypted ballots, wherein ballot tabulation includes providing the local election official with a token and a tabulation computer and requiring the election official to login to the tabulation computer and a second election official to login to the central hosting facility, separating voter identification information from the encrypted ballots and transferring the encrypted ballots to the tabulation computer, decrypting the ballots by decrypting the symmetric key associated with each ballot with the local election office's public key and decrypting each ballot with its associated symmetric key, and tabulating the decrypted ballots.

2. An automated electronic identity authentication system comprising:
- a central hosting facility connected to a network, the central hosting facility including a home page as an access point, an application processing segment for providing election processing, and a storage segment for temporary and persistent storage of data;
- a remote computing device that allows a user to connect to the network for accessing the central hosting facility; and
- an authentication system connected to the central hosting facility and to the remote computing device, wherein the authentication system receives and processes identifying data from the user and assigns a roaming digital certificate to the user in response to the user submitting an approved identifying data,
- wherein the an authentication system completes an electronic application, digitally signs the application with the assigned roaming digital certificate, and forwards the digitally signed application to the central hosting facility.

3. The se automated electronic identity authentication system of claim 2 further comprising an application residing on said computing device, wherein said computing device application presents an electronic ballot to a user and said computing device application forwards voting data to the central hosting facility in an encrypted format, and wherein said central hosting facility receives and authenticates the voting data using the roaming digital certificate.

4. The automated electronic identity authentication system of claim 2, wherein the central hosting facility further comprises:
- a first firewall between the network and the home page for protecting the central hosting facility from unauthorized access from the network; and
- a second firewall between the home page and the processing segment providing additional protection from unauthorized access to the central hosting facility.

5. The automated electronic identity authentication system of claim 2, wherein the home page further comprises a home page and common services element.

6. The automated electronic identity authentication system of claim 5, wherein the home page and common services element further comprises:
- presentation services;
- logging and auditing services;
- application integration services;
- common services;
- access control and authorization services; and
- data access services.

7. The automated electronic identity authentication system of claim 2, wherein the application processing segment further comprises an identification and authentication process element.

8. The automated electronic identity authentication system of claim 7, wherein the identification and authentication process element further comprises:
- on-line absentee voter application services;
- identity proofing services;
- registration services;
- registered user login services; and
- roaming digital certificate and managed public key infrastructure services.

9. The automated electronic identity authentication system of claim 2, wherein the application processing segment further comprises a voter registration process element.

10. The automated electronic identity authentication system of claim 9, wherein the voter registration process element further comprises:
- electronic voter registration services;
- status checking services;
- communications and transmittal of electronic absentee voter application services;
- secure messaging services;
- voter registration verification and update services; and
- voter registration database creation and maintenance services.

11. The automated electronic identity authentication system of claim 2, wherein the application processing segment further comprises a ballot definition process element.

12. The automated electronic identity authentication system of claim 11, wherein the ballot definition process element further comprises:
- balloting system interface services;
- ballot conversion services;
- ballot definition services; and
- ballot database creation and maintenance services.

13. The automated electronic identity authentication system of claim 2, wherein the application processing segment further comprises a voting engine process element.

14. The automated electronic identity authentication system of claim 13, wherein the voting engine process element further comprises:
- ballot generation services;
- ballot presentation services;
- vote casting and symmetric encryption services;
- vote review, change, and confirmation services;
- cast ballot database creation and maintenance services; and
- vote auditing services.

15. The automated electronic identity authentication system of claim 2, wherein the application processing segment further comprises a ballot reconciliation and tabulation process element.

16. The automated electronic identity authentication system of claim 15, wherein the ballot reconciliation and tabulation process element further comprises:
- controlled login for local election office services;
- ballot reconciliation services;
- voter identification and ballot separation services;
- cast ballot local election office database creation and maintenance services;
- download encrypted ballot to local election office services;
- dual login and ballot decryption services;
- cast ballot tabulation services;
- cast ballot conversion services; and
- auditing services.

17. The automated electronic identity authentication system of claim 2, wherein the data storage segment further comprises physically separated storage space for each local election office using the secure electronic registration and voting system.

18. The automated electronic identity authentication system of claim 2, wherein the data storage segment further comprises logically separated storage space for each local election office using the secure electronic registration and voting system.

19. A method for automated electronic identity authentication through an electronic registration system, comprising the steps of:
    providing a computer to a user;
    the computer accessing an electronic registration system and forwarding user identifying data to the electronic registration system;
    the electronic registration system receiving and processing the identifying data; and assigning a roaming digital certificate to the user in response to the identifying data, wherein the an authentication system completes an electronic application, digitally signs the application with the assigned roaming digital certificate, and forwards the digitally signed application to a remote server.

20. The method of claim 19 further comprising the steps of:
    the computer accessing a the remote server;
    said remote server returning ballot data;
    said computer presenting said ballot data to the user;
    said computer receiving ballot response data from the user in response to the presentation of the ballot data and associating the voting data with the roaming digital certificate;
    said computer encrypting the associated voting data and forwarding said encrypted associated voting data to the remote server; and
    the remote server authenticating the associated voting data with the electronic application and storing the authenticated encrypted voting data.

21. The method of claim 19, further comprising the steps of:
    the remote server determining the existence of the user's department of defense credential; and
    the remote server determining the existence of the user's digital signature if no department of defense credential does not exist.

22. The method of claim 21, further comprising the step of the remote server providing an identity proofing form to the user if the user's digital signature does not exist.

23. The method of claim 22, further comprising the steps of:
    completing the identity proofing form by the user;
    notarizing the identity proofing form; and
    sending the identity proofing form to a verification entity.

24. The method of claim 23, further comprising the steps of:
    validating the identity proofing form by the verification entity; and
    issuing a digital signature to the user.

* * * * *

UNITED STATES PATENT AND TRADEMARK OFFICE
CERTIFICATE OF CORRECTION

| | | |
|---|---|---|
| PATENT NO. | : 7,565,540 B2 | Page 1 of 1 |
| APPLICATION NO. | : 11/176681 | |
| DATED | : July 21, 2009 | |
| INVENTOR(S) | : John J. Bogasky et al. | |

It is certified that error appears in the above-identified patent and that said Letters Patent is hereby corrected as shown below:

On the title page, item (75), line 3, "Schaefer," should read --Schafer,--.

In claim 2, column 17, line 28, "the an authentication" should read --the authentication--.

In claim 3, column 17, line 33, "The se automated" should read --The automated--.

In claim 19, column 19, line 15, "the an authentication" should read --an authentication--.

In claim 20, column 19, line 21, "a the remote" should read --the remote--.

In claim 21, column 20, line 12, "no" should read --a--.

Signed and Sealed this

Twenty-ninth Day of September, 2009

David J. Kappos
*Director of the United States Patent and Trademark Office*